H. T. HERR.
ROTARY VALVE FOR INTERNAL COMBUSTION ENGINES.
APPLICATION FILED JAN. 14, 1914.
1,258,406.
Patented Mar. 5, 1918.
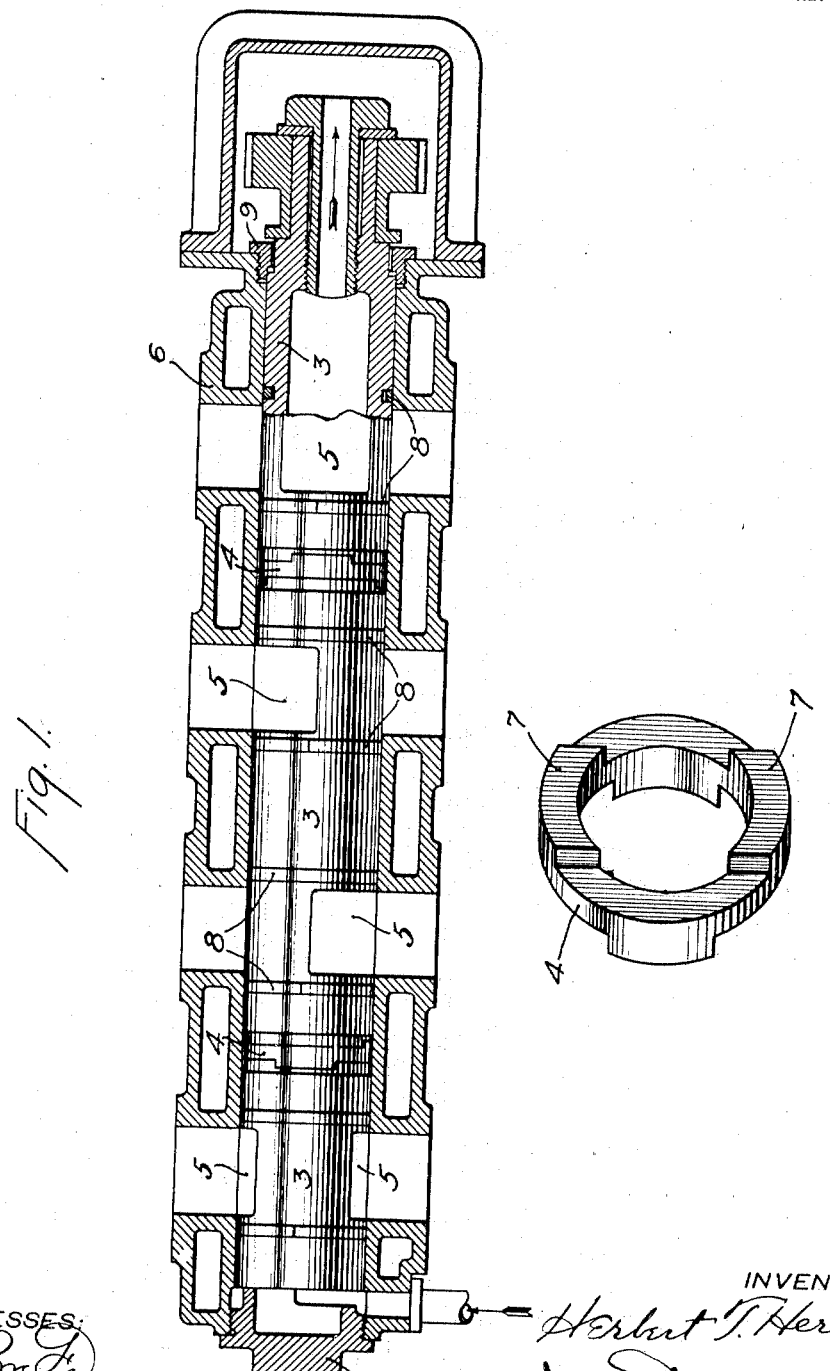
INVENTOR.
Herbert T. Herr
BY
HIS ATTORNEY IN FACT
WITNESSES:

UNITED STATES PATENT OFFICE.

HERBERT T. HERR, OF PITTSBURGH, PENNSYLVANIA, ASSIGNOR TO THE WESTING-HOUSE MACHINE COMPANY, A CORPORATION OF PENNSYLVANIA.

ROTARY VALVE FOR INTERNAL-COMBUSTION ENGINES.

1,258,406.  Specification of Letters Patent.  Patented Mar. 5, 1918.

Application filed January 14, 1914. Serial No. 812,036.

*To all whom it may concern:*

Be it known that I, HERBERT T. HERR, a citizen of the United States, and a resident of Pittsburgh, in the county of Allegheny and State of Pennsylvania, have made a new and useful Invention in Rotary Valves for Internal-Combustion Engines, of which the following is a specification.

An object of this invention is to produce an improved valve, which overcomes difficulties ordinarily encountered with cylindrical rotary valves of multi-cylinder internal combustion engines.

A further object is to produce an articulate valve for internal combustion engines in which improved means are employed for cooling the valve and also lubricating its cylinders.

These and other objects I attain by means of a valve embodying the features herein described and illustrated in the drawings accompanying and forming a part of this application.

In the drawings:

Figure 1 is a plan view of a valve, embodying my invention, shown in connection with a sectional view of the valve housing, or casing, in which the valve is located. A portion of the valve is shown in section in Fig. 1 for convenience of illustration;

Fig. 2 is a perspective view of a floating disk coupling which forms a part of the valve illustrated.

The valve illustrated as an embodiment of my invention is adapted to control the delivery of combustible charge to, and the discharge of burned gases from all of the cylinders of a multi-cylinder internal combustion engine, and it is adapted to be journaled in a plurality of alined bearings, forming a part of a valve casing which may be formed integrally with the cylinders of the engine. It is difficult, and, in fact, impossible to so construct the bearings for such a valve that they maintain exact alinement during the operation of the engine. Even where the cylinders of the engine and the valve casing are cast *en bloc* and all the bearings are bored in one continuous operation, inequalities in the alinement of the bearings, resulting either from a lack of exactness in the boring operation or from variations in temperature strains in the metal of the cylinders, are encountered and impair the operation of the valve. Where the misalinement of the bearings is aggravated by inaccuracies in the shape of the valve itself, serious difficulty is apt to be encountered. One of the principal objects of my present invention is to eliminate the difficulty above enumerated and to produce a rotary valve of the cylinder type which will operate effectively and smoothly even though its bearings in the valve casing are not in exact alinement.

I accomplish this by providing an articulate valve; that is, a valve formed in a number of separate sections, each of which is jointed to an adjacent section in such a way that it is angularly movable with relation thereto, and can rotate about a substantially different axis of rotation from that of adjacent sections during the operation of the valve, so as to compensate for a misalinement of the bearings and minimize the detrimental effect ordinarily resulting from such a misalinement.

The valve illustrated is a cylindrical rotary valve adapted to control the delivery of charge to, and the discharge of burned gases from all of the cylinders of an internal combustion engine. It is hollow or is tubular in form so as to provide for a flow of cooling liquid from one end to the other, through it. As shown, it is composed of alternately arranged sections 3 and floating disk couplings 4, the latter forming joints between adjacent sections 3 such that all the sections are rotated together as a single piece, but each is capable of a slight amount of angular motion with relation to the axes of the others without detrimentally affecting the operation of the valve.

Each valve section 3 is hollow and is provided with a recess or groove 5 in its peripheral face, which alternately establishes communication between each engine cylinder and admission and exhaust ports, formed in the valve casing 6.

Each coupling disk 4 may be of substantially the same external diameter as the valve sections 3, although it is preferably of somewhat smaller diameter as is shown in the drawings. The disk is annular in form having an axially extending opening formed in it, and as shown is provided with laterally projecting lugs 7 provided on each lateral face. These lugs are adapted to engage correspondingly located slots formed in the end faces of the valve sections and to thereby form a coupling between the disk and the sections which will permit the sections to move angularly with relation to the axis of the disk, but will transmit rotary motion from one valve section to the other. The lugs on one side of the disk are shown in staggered relation with the lugs on the other side and are preferably similar to them in location, form, and spacing, so that each disk is interchangeable end for end. All the disks of the valve are preferably similar in construction so that they are interchangeable one for the other.

The valve casing 6 shown, is preferably formed integrally with the engine cylinders (not shown) but is will be understood that it may be formed separately and if desired, in separate pieces which may be secured in place in any suitable manner so that a continuous cylindrical bore is provided for the reception of the valve.

In assembling the valve, the valve sections 3 are coupled together by the disks 4 and are slid endwise into place within the casing 6, and the disks float or are loosely maintained between the sections. The valve sections are preferably so proportioned with relation to the spacing of the continuous cylindrical bearing faces of the casing 6 that the coupling disks are engaged by these continuous portions of the bearing and in this way are held in the proper position with relation to the valve section with which they coöperate. As illustrated, each valve section is of such length that its central portion is journaled in one continuous bearing face of the housing and its ends are journaled in adjacent continuous faces so that it overhangs the admission ports of two adjacent cylinders, and so that the recesses 5 control the ports in the casing. The valve sections are also provided with circumferentially extending grooves in which packing rings 8 are located. A packing ring is preferably located adjacent to each set of ports in the casing 6 so that it prevents the lubricant of the bearing from entering the engine cylinder and also prevents burning gases discharged from the cylinder from burning out the lubricant in the bearings.

The valve as shown is held in place within the housing by means of a collar 9, which is screwed into one end of the casing 6 and a plug 10 screwed into the other end of the casing. This locks the sections 3 against longitudinal motion and also holds the coupling disks 4 in position between the sections. The assembled valve is also provided with an axially extending opening from end to end, to which cooling lubricant may be delivered. I find it preferable to employ a lubricant, such as oil, for cooling the valve, since the leakage of this lubricant around the coupling disk operates to lubricate the bearings of the valve. I also find it desirable to provide lubricant discharge ports in the sections 3 at convenient points along the valve for the purpose of lubricating these bearings.

It will be understood that while, in accordance with the requirements of the patent statutes, I have illustrated what I now consider to be the preferred embodiment of my invention, various changes, modifications, substitutions and omissions may be made in the apparatus illustrated without departing from the spirit and scope of my invention as set forth in the appended claims.

Having thus described my invention, what I claim is:

1. In combination with a cylindrical valve formed in separate sections, coupling means for securing adjacent sections of said valve together, said coupling means and said sections providing a central passage for cooling fluid through the valve.

2. In combination with a valve housing having a plurality of longitudinally spaced bearing surfaces provided therein, a hollow cylindrical articulated valve located in the casing and journaled on said bearing surfaces, said valve having an axial passage extending therethrough, and means for delivering cooling liquid to one end of said passage.

3. A hollow cylindrical valve formed in separate longitudinally extending sections, and having fluid delivery grooves formed in the peripheral face thereof and a floating ring for coupling adjacent sections together without interrupting communication between the hollow interiors thereof, said ring having lugs formed thereon for engaging slots formed in the ends of coupled sections.

4. A hollow cylindrical valve formed in separate open ended cylindrical sections, each section having coupling ring engaging lugs formed on at least one end thereof and extending longitudinally with the outer faces of the lugs substantially flush with the outer peripheral face of the section, and a floating ring between each pair of adjacent sections having substantially the same external diameter as the sections and provided with laterally projecting lugs located in staggered relation on each side thereof for engaging the lugs on the section, said ring being so formed as to provide an unobstructed passage through the assembled valve, and the outer faces of the ring lugs being substantially flush with the outer peripheral face of the ring.

5. In combination with a cylindrical valve housing of an engine, a hollow cylindrical valve formed in open ended cylindrical sections of substantially the same external diameter as the internal diameter of said housing, longitudinally extending coupling-ring engaging lugs formed on at least one end of each section and having their outer faces substantially flush with the outer peripheral face of the section on which they are formed, a floating coupling ring of substantially the same external diameter as the internal diameter of the housing located between each pair of adjacent sections, and laterally extending lugs formed on each ring for engaging the lugs of adjacent sections, said ring lugs having their outer faces substantially flush with the outer peripheral face of the ring.

6. In combination with a valve housing having cylindrical bearing surface formed therein, an articulate valve located within said housing and journaled in said bearings, said valve comprising hollow cylindrical open ended sections, having coupling engaging lugs formed on at least one end of each section, a floating ring located between each pair of adjacent sections and having laterally projecting lugs formed on each side thereof for engaging said section lugs, said ring being so formed as to provide an unobstructed passage through the valve.

In testimony whereof, I have hereunto subscribed my name this 12th day of January, 1914.

HERBERT T. HERR.

Witnesses:
C. W. McGHEE,
E. W. McCALLISTER.